United States Patent
Kubo et al.

(10) Patent No.: US 6,832,326 B2
(45) Date of Patent: Dec. 14, 2004

(54) MULTIPROCESSOR CLOCK SYNCHRONIZATION WITH ADJUSTMENT BASED ON MEASURING PROPAGATION DELAY BETWEEN A PROCESSOR AND A PLURALITY OF PROCESSORS

(75) Inventors: Masahito Kubo, Kawasaki (JP); Haruhiko Ueno, Kawasaki (JP); Akikazu Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 591 days.

(21) Appl. No.: 09/808,343

(22) Filed: Mar. 15, 2001

(65) Prior Publication Data

US 2002/0019951 A1 Feb. 14, 2002

(30) Foreign Application Priority Data

Aug. 2, 2000 (JP) ........................................ 2000-233811

(51) Int. Cl.[7] ................................................. G06F 1/12
(52) U.S. Cl. ........................................ 713/400; 709/400
(58) Field of Search ........................... 713/400; 709/400

(56) References Cited

U.S. PATENT DOCUMENTS

| | | | | | |
|---|---|---|---|---|---|
| 4,807,259 | A | * | 2/1989 | Yamanaka et al. | 375/358 |
| 6,199,169 | B1 | * | 3/2001 | Voth | 713/400 |
| 6,470,458 | B1 | * | 10/2002 | Dreps et al. | 713/400 |
| 6,502,141 | B1 | * | 12/2002 | Rawson, III | 709/400 |
| 6,552,998 | B1 | * | 4/2003 | Matsunaga | 370/228 |

FOREIGN PATENT DOCUMENTS

| | | |
|---|---|---|
| JP | A-2-212911 | 8/1990 |
| JP | A-210518 | 8/1995 |

* cited by examiner

*Primary Examiner*—Thomas Lee
*Assistant Examiner*—Albert Wang
(74) *Attorney, Agent, or Firm*—Staas & Halsey LLP (57) ABSTRACT

In a multi-processor system, each processor transmits a system time synchronous signal to another processor using hardware, and measures the propagation delay time of the signal. Then, the timer value of each processor is adjusted with the measured propagation delay time.

11 Claims, 6 Drawing Sheets

MULTIPROCESSOR CLOCK SYNCHRONIZATION WITH ADJUSTMENT BASED ON MEASURING PROPAGATION DELAY BETWEEN A PROCESSOR AND A PLURALITY OF PROCESSORS

BACKGROUND OF THE INVENTION

1. Field of the Invention

The present invention relates to the time control and timing service of a computer system. It especially relates to the timer adjusting system that performs the time adjustment between the processors in a multi-processor system.

2. Description of the Related Art

A microprocessor generally has a timer (TICK) that is updated by the operation clock of a processor. There are many cases that this timer is used for time-of-day clocking and timing service of a computer system.

Today's mission-critical computer systems are usually large scale, multi-processor systems carrying fair number of processors. In such large scale multi-processor systems, there are many cases that the whole system is divided into a plurality of partitions, and each partition is actuated as a symmetric multi-processor (SMP) system. In a symmetric multi-processors system, all the processors share work loads in unit called a process, communicating through the main storage shared over the processors.

In such a system, it is required that the time of day clocked in each processor partition should be same in fair accuracy. If the time of day in the processors are not same, there could be the cases in which the execution sequence of the processes cannot be maintained properly over their migration between processors. This causes a problem for the work loads that use the time of day in each processor to synchronize the processes.

Therefore, in a conventional multi-processor system, an apparatus for adjusting the timer value (TICK value) of the processors in a partition is adapted. For example, there is a software-based time, in that the TICK value is read out from a certain processor, and the value is sent to another processor in the same partition via a main storage. Then, the processor that receives the TICK value adjusts the time by writing the value in its own TICK.

In the above-mentioned conventional time adjustment method, however, there are following problems:

One of the problems in the adjustment comes from the operating frequency of microprocessors which has been brought more than a GHz by the advancement in semiconductor technology and processor design technology. With such high operating frequency, the time in processor cycles required for the transfer of the TICK value via main storage becomes long and cannot be ignored in the symmetric multi-processors system.

In the prior art, however, this transfer time was not measured, and the time adjustment was performed ignoring the influence of the transfer time. Therefore, the possibility for the error of the time between processors caused by the transfer of a TICK value influence the order, etc. of processes becomes higher, as the operation frequency increases.

SUMMARY OF THE INVENTION

It is an object of the present invention to provide a software-oriented timer adjusting system that accurately performs the time adjustment between processors in a multi-processors system with some hardware assist.

At the first aspect of the present invention, the timer adjusting system is provided with a generating circuit, an out put circuit, an input circuit, a measuring circuit, and a synchronizing circuit. The system adjusts the time of a plurality of processors in a multi-processor system.

The generating circuit generates a time synchronous signal which indicates certain synchronous events. The output circuit outputs the time synchronous signal. The input circuit inputs the time synchronous signal that is output from the output circuit and travels through the part of timer adjusting system provided in the system and returns to the input circuit of the processor.

The measuring circuit measures the travel time of the time synchronous signal through the timer adjusting system. The synchronizing circuit adjusts time information of one or more timers of a plurality of processors using the measured period of time as a period of time for propagating the time synchronous signal between two processors in the multi-processor system, and synchronizes the timers of these processors.

At the second aspect of the present invention, the timer adjusting system is provided with a generating circuit, an output circuit, an input circuit, a measuring circuit, a synchronizing circuit, and a distributing circuit. The system adjusts the time of a plurality of processors in a multi-processor system. The generating circuit, output circuit, and input circuit are provided with each of a plurality of processors.

The generating circuit generates a time synchronous signal in the multi-processor system. The output circuit outputs the time synchronous signal as a synchronous output, and the input circuit inputs a synchronous input. The distributing circuit generates a logical OR signal of a plurality of synchronous outputs that are output from a plurality of processors, and distributes the logical OR signal to the plurality of processors as a synchronous input.

The measuring circuit measures a period of time while one of the plurality of processors outputs a synchronous output and receives a synchronous input. The synchronizing circuit corrects time information of one or more timers of a plurality of processors, using the measured period of time as a period of time for propagating the logical OR signal, and synchronize the timers of the plurality of processors.

DESCRIPTION OF THE PREFERRED EMBODIMENTS

The embodiments of the present invention are explained in detail by referring to the attached drawings.

Figure 1:
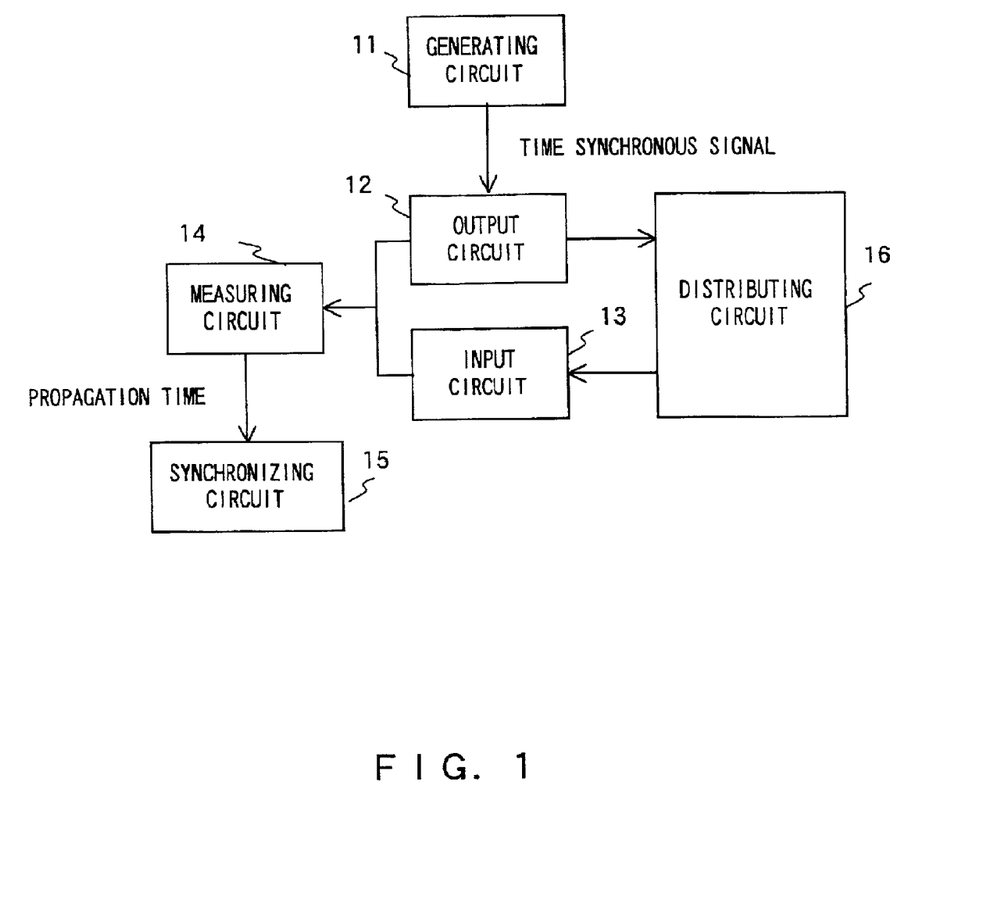
FIG. 1 is a block diagram of a timer adjusting system of the present invention.

FIG. 1 is a block diagram of the timer adjusting system of the present invention. At the first aspect of the present invention, the timer adjusting system is provided with a generating circuit 11, an output circuit 12, an input circuit 13, a measuring circuit 14, and a synchronizing circuit 15. The system adjusts the time of a plurality of processors in a multi-processor system.

The generating circuit 11 generates a time synchronous signal of the multi-processor system. The output circuit 12 outputs a time synchronous signal. The input circuit 13 inputs the time synchronous signal that is output from the output circuit 12 and returns after being propagated in the multi-processor system.

The measuring circuit 14 measures a period of time while the output circuit 12 outputs a time synchronous signal and the input circuit 13 inputs the time synchronous signal. The synchronizing circuit 15 corrects the time information of one or more timers of a plurality of processors using the measured period of time as a period of time for propagating the time synchronous signal between two processors, thereby synchronizing the timers of these processors.

The time synchronous signal generated by the generating circuit 11 is output from the output circuit 12, and returns to the input circuit 13 after being propagated in the specified path of the multi-processor system. The measuring circuit 14 measures a propagation time of the time synchronous signal, and passes the time to the synchronizing circuit 15. The synchronizing circuit 15 corrects the time information of a timer using the received propagation time as the propagation time between two processors, and adjusts the time. In this way, the timers of a plurality of processors synchronize with each other.

According to such a timer adjusting system, the time synchronous signal can be transmitted between two processors, and the propagation time of the signal can be measured. Thus, the timer of each processor can be adjusted taking the propagation time of the signal into consideration, so that the precision of the time adjustment improves.

At the second aspect of the present invention, the timer adjusting system is provided with the generating circuit 11, output circuit 12, input circuit 13, measuring circuit 14, synchronizing circuit 15, and distributing circuit 16. The system adjusts the timers of a plurality of processors in the multi-processor system. The generating circuit 11, output circuit 12 and input circuit 13 are provided with each of a plurality of processors.

The generating circuit 11 generates a time synchronous signal of the multi-processor system. The output circuit 12 outputs the time synchronous signal as a synchronous output. The input circuit 13 inputs the synchronous input. The distributing circuit 16 forms the logical OR signal of a plurality of synchronous outputs that are output from a plurality of processors, and distributes the logical OR signal to a plurality of processors as a synchronous input.

The measuring circuit 14 measures a period of time while one of a plurality of processors outputs synchronous output and receives synchronous input. The synchronizing circuit 15 corrects the time information of one or more timers of a plurality of processors, using the measured period of time as a period of time for propagating the logical OR signal, and synchronizes the timers of these processors.

Since the logical OR of the synchronous outputs that are output from a plurality of processors is distributed to these processors by the distributing circuit 16, the synchronous inputs of all the processors are asserted if any processor asserts the synchronous output. Therefore, the time synchronous signal of one processor can be simultaneously transmitted to all the other processors in the system partition.

According to such a timer adjusting system, the precision of time adjustment improves, and the timers of a plurality of processors can be easily adjusted similarly to the timer adjusting system of the first aspect.

For example, the generating circuit 11 in FIG. 1 corresponds to a TICK register 53, an incrementor 54, a multiplexer 55, and an AND circuit 56 in FIG. 3 that are described later. The output circuit 12 corresponds to an AND circuit 56 in FIG. 3. The input circuit 13 corresponds to an AND circuit 46 in FIG. 3. The measuring circuit 14 corresponds to a TICK adjusting circuit in FIG. 3, a CPU (Central processing Unit) 21, and a main storage 24 in FIG. 2 that are described later. The synchronizing circuit 15 corresponds to the CPU 21 and main storage 24 in FIG. 2. The distributing circuit 16 corresponds to TICK adjusting trees 26 and 27 in FIG. 2.

The multiprocessor system of the present embodiment possesses a plurality of timers distributed in the system, in order to offer various kinds of timing services, and adjusts these timer values so that the values match with each other. The outline of the system hardware and software that are used for the timer adjustment is as follows:

(1) Each processor in the system is provided with a TICK synchronous output (TICK.sync-out) and a TICK synchronous input (TICK.sync-in) for the time synchronization.

(2) The system hardware receives the TICK synchronous outputs that are output by all the processors in the same partition, and outputs the logical OR of these TICK synchronous outputs to all the processors as the time synchronous signal of the processors in the same partition. The propagation delay time of the signal distributed by the system hardware to each processor depends on the system, but the propagation delay time is same to all the processors in the same partition.

(3) Each processor receives the time synchronous signal as its TICK synchronous input from the system hardware. The signal is used for the adjustment of the TICK value of the processor.

(4) Each processor measures a propagation delay time synchronous signal using software. The software measures a propagation delay time prior to the TICK synchronizing operation, and uses the measured time for the adjustment of the TICK value.

According to such a system, each processor can send a system time synchronous signal to the other processors using hardware, and can also measure the propagation delay time of the signal. The precision of time adjustment improves by adjusting the TICK values of the respective processors while taking the measured propagation delay time into consideration.

Figure 2:
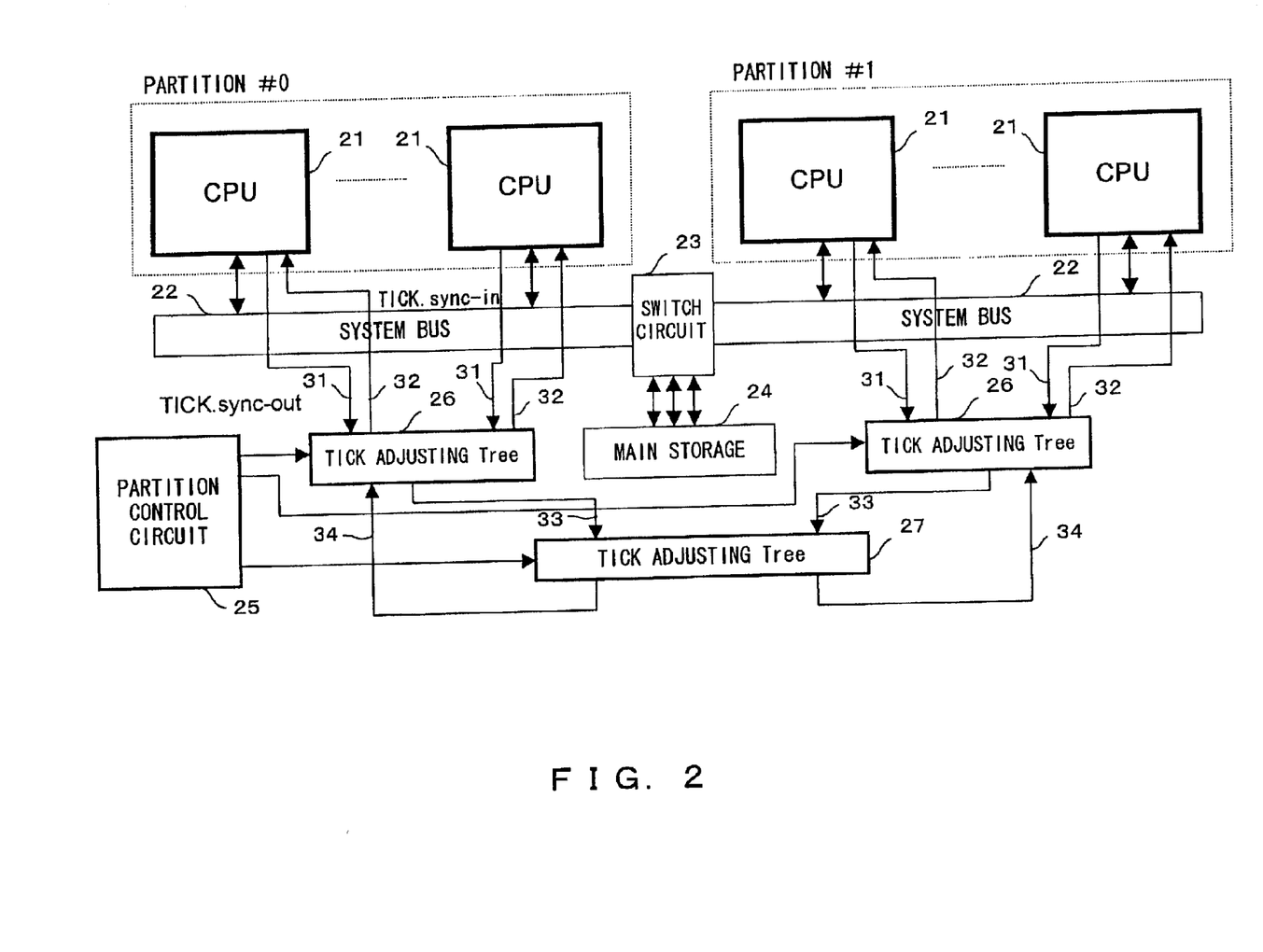
FIG. 2 is the configuration diagram of a multi-processor system.

FIG. 2 is a configuration diagram of such a multi-processor system. The multi-processor system shown in FIG. 2 is provided with a plurality of CPUs (Central processor Unit) 21, a system bus 22, a switching circuit (crossbar switch) 23, main storage 24, a partition control circuit 25, and TICK adjusting trees 26 and 27.

The time adjusting program for measuring a propagation delay time and for performing a TICK synchronizing process may be stored either in the main storage 24 or in a ROM (Read Only Memory) connected to the bus 22, and is executed by the CPU 21.

Each CPU 21 accesses the main storage 24 through the system bus 22 and switch circuit 23. The TICK adjusting trees 26 and 27 are handled as system common resources, and each tree includes a circuit for computing the logical OR of the TICK synchronous outputs in the same partition and distributing the computation result as the TICK synchronous input of the partition.

The TICK adjusting tree 26 generates the logical OR of TICK.sync-out's that are input through signal lines 31 from the CPUs 21, and outputs the logical OR to the CPUs 21 or the TICK adjusting tree 27 through signal lines 32 or a signal line 33. The signal that is input to the CU 21 from the signal line 32 corresponds to TICK.sync-in.

The TICK adjusting tree 27 obtains the logical OR of the signals that are input through the signal lines 33 from the TICK adjusting trees 26, outputs the sum to the TICK adjusting trees 26 through the signal lines 34. The signal that is input to the TICK adjusting tree 26 from a signal line 34 is output to the CPU 21 as TICK.sync-in.

The partition control circuit 25 includes a register that controls the logical configuration of the system. The circuit separates the system into a plurality of partitions. Each partition operates as a symmetric multi-processor system. In this case, each partition is controlled by an independent operating system (OS). Here, two partitions #0 and #1 are logically formed, and a plurality of the CPUs 21 that belong to the respective partition cooperate using a specific common area of the main storage 24.

The partition control circuit 25 also separates the TICK adjusting trees 26 and 27 based on the partitions, in order to synchronize the timers separately for each partition. A detailed example of the partition control circuit 25 and TICK adjusting trees 26 and 27 are described later.

Figure 3:
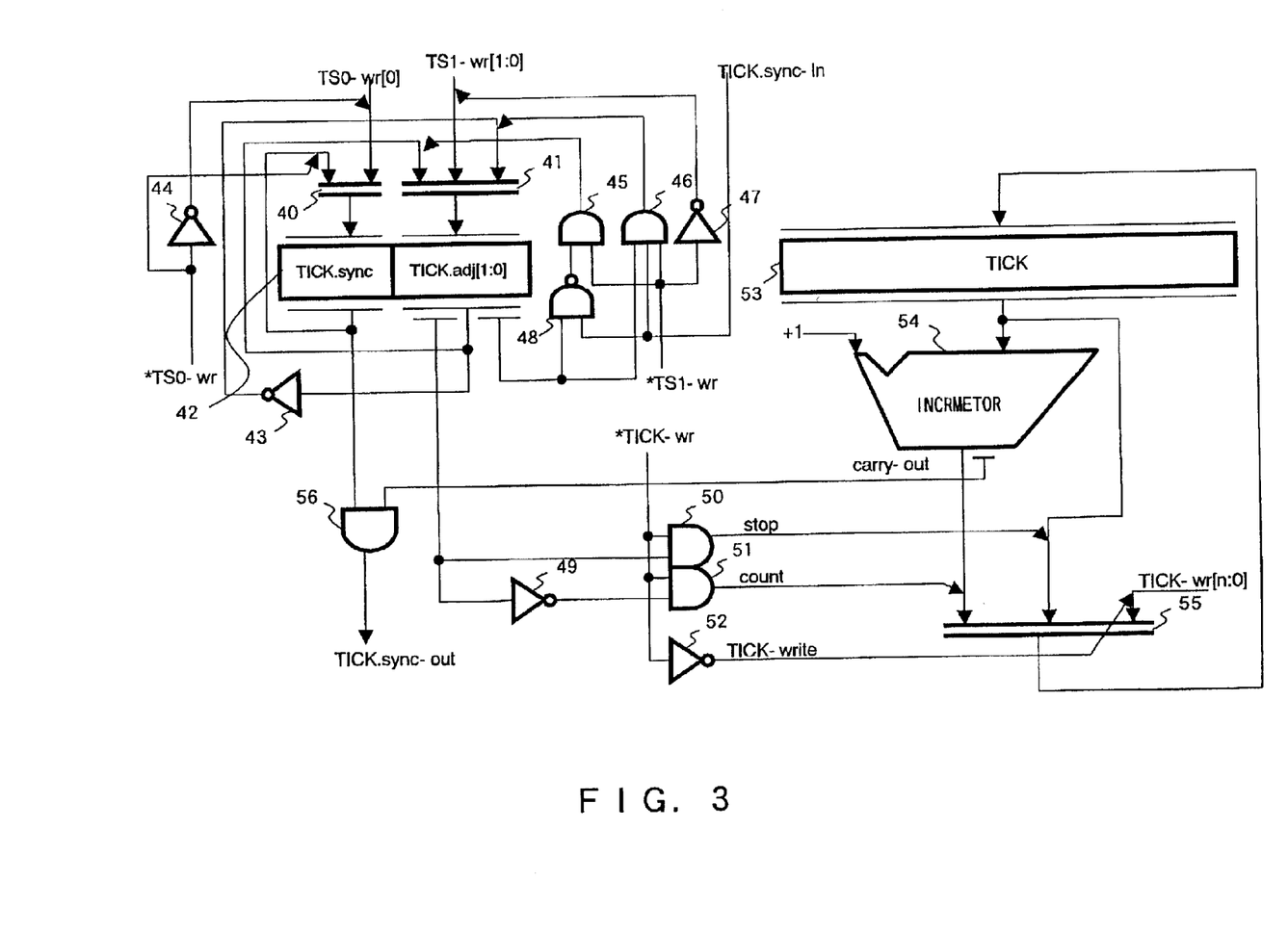
FIG. 3 is the configuration diagram of a TICK adjusting circuit.

FIG. 3 is a configuration diagram of the TICK adjusting circuit that is provided in the CPU 21 shown in FIG. 2. The TICK adjusting circuit shown in FIG. 3 includes a multiplexers 40, 41, and 55, a TICK synchronization control register 42, inverter circuits 43, 44, 47, 49, and 52, AND circuits 45, 46, 50, 51, and 56, a NAND circuit 48, a TICK register 53, and an incrementor 54.

Among these units, the TICK register 53, incrementor 54, and multiplexer 55 configure a timer circuit. The TICK register 53 stores the TICK value that represents the time within the CPU. The incrementor 54 adds 1 to the TICK value that is output from the TICK register 53, and outputs the sum.

The multiplexer 55 selects one of the outputs of the incrementor 54, the output of the TICK register 53, and the writing value TICK-wr[n:0] to the TICK register 53, and outputs the selected value to the TICK register 53. The value of TICK-wr[n:0] is formed by the ALU (Arithmetic and Logic Unit) in the CPU based on the control of the time adjusting program.

The TICK synchronization control register 42 has three control bits of TICK.sync (one bit) and TICK.adj[1:0] (two bits) The Inverter circuit 43 inverts the value of TICK.adj[1:0] that is output from the TICK synchronization control register 42, and outputs the inverted value to the multiplexer 41. Further, the inverter circuit 44 inverts the value of TICK.sync that is output from the TICK synchronization control register 42, and outputs the inverted value to the multiplexer 40.

The multiplexer 40 selects one of the TICK.sync outputs from the TICK synchronization control register 42 and the writing value TS0-wr[0] to the TICK synchronization control register 42, and outputs the selected value to the TICK.sync of the TICK synchronization control register 42.

The multiplexer 41 selects one of the TICK.adj[1:0] outputs from the TICK synchronization control register 42, the writing value TS1-wr[1:0] to the TICK synchronization control register 42, and the output of the inverter circuit 43, and outputs the selected value to TICK.adj[1:0] of the TICK synchronization control register 42. The values of TS0-wr[0] and TS1-wr[1:0] are formed by the ALU based on the control of the time adjusting program.

The AND circuit 56 generates logical AND of TICK.sync that is output from the TICK synchronization control register 42 and a carry-out from a bit position which corresponds to a sufficient period of time for the adjustment from the incrementor 54, and outputs the AND as TICK.sync-out. The carry-out corresponds to the carry-out of the timer circuit, and it becomes logic "1" when carry is generated in a specific bit of the TICK value by the incrementor 54.

The inverter circuit 44 inverts the value of signal *TS0-wr, and outputs the inverted value to the multiplexer 40. The *TS0-wr corresponds to the negation signal of a signal TS0-wr that instructs the writing of TICK.sync to the TICK synchronization control register 42.

The multiplexer 40 selects TICK.sync when *TS0-wr is "1", and selects TS0-wr[0] when *TS0-wr is "0" (the output of the inverter circuit 44 is "1"), and writes the selected value in TICK.sync.

The AND circuits 45 and 46, inverter circuit 47, and NAND circuit 48 generate the control signal of the multiplexer 41. The NAND circuit 48 negates the logical AND of the value of bit 0 of TICK.adj[1:0] and TICK.sync-in, and outputs the negation to the AND circuit 45. The AND circuit 45 generates the logical AND of the output of the NAND circuit 48 and signal *TS1-wr, and outputs the logical AND to the multiplexer 41. The *TS1-wr corresponds to the negation signal of a signal TS1-wr that instructs the writing of TICK.adj[1:0] to the TICK synchronization control register 42.

The AND circuit 46 generates the logical AND of the value of bit 0 of TICK.adj[1:0], TICK.sync-in, and *TS1-wr, and outputs the logical AND to the multiplexer 41. Further, the inverter circuit 47 inverts the value of *TS1-wr, and outputs the inverted value to the multiplexer 41.

The multiplexer 41 selects TICK.adj[1:0] when the output of the AND circuit 45 is "1", and selects the output of the inverter circuit 43 when the output of the AND circuit 46 is "1". Further, the multiplexer 41 selects TS1-wr[1:0] when the output of the inverter circuit 47 is "1".

When *TS1-wris "0",the outputs of the AND circuits 45 and 46 become "0" and the output of the inverter circuit 47 becomes "1". Therefore, the value of TS1-wr[1:0] is written into TICK.adj[1:0]. When *TS1-wr is "1", the output of the inverter circuit 47 becomes "0". Therefore, the set value of TICK.adj[1:0] is determined according to the values of bit 0 of TICK.adj[1:0] and the value of TICK.sync-in.

Further, the inverter circuits 49 and 52, and the AND circuits 50 and 51 generate the control signal of the multiplexer 55. The AND circuit 50 generates the logical AND of the value of bit 1 of TICK.adj[1:0] and the signal *TICK-wr, and outputs the logical AND to the multiplexer 55 as a signal stop. The *TICK-wr corresponds to the negation signal of TICK-wr that instructs the writing to the TICK register 53.

The inverter circuit 49 inverts the value of bit 1 of TICK.adj[1:0], and outputs the inverted value to the AND circuit 51. The AND circuit 51 generates the logical AND of the output of the inverter circuit 49 and the signal *TICK-wr, and outputs the product to the multiplexer 55 as a signal count. Further, the inverter circuit 52 inverts the value of *TICK-wr, and outputs the inverted value to the multiplexer 55 as a signal TICK-write.

The multiplexer 55 selects the TICK value when the signal stop is "1", selects the count value of the incrementor 54 when the signal count is "1", and selects TICK-wr[n:0] when TICK-write is "1".

When *TICK-wr is "0", the signals stop and count become "0", and TICK-write becomes logic "1". Therefore, the value of TICK-wr[n:0] is written to TICK. When

*TICK-wr is "1", TICK-write becomes "0". Therefore, the set value of TICK is determined according to the value of bit 1 of TICK.adj[1:0].

According to such a circuit configuration, after "1"is written to TICK.sync of the register 42, the pulse of TICK.sync-out is asserted when the incrementor 54 asserts the carry output. The bit location of the carry output is selected, for example, so as to give a sufficient time for the time adjusting program to perform the TICK synchronization process. When the TICK.sync-out is not required to be asserted, "0" is set to the TICK.sync.

The TICK.adj[1:0] of the register 42 has the TICK adjustment field of two bits, and controls the condition of the timer circuit and the operation performed at the time of receiving TICK.sync-in according to the set value when *TS1-wr and *TICK-wr are "1".

TICK.adj[1:0]=00 corresponds to a stable condition. The signal stop becomes logic "0", and the signal count becomes "1". Therefore, the timer circuit starts counting, and updates the TICK value. Even if TICK.sync-in becomes "1" under this condition, the value of TICK.adj[1:0] does not change, so the operation is not affected.

TICK.adj[1:0]=01 corresponds to a measurement condition where the propagation delay time of a system time synchronous signal is measured, and the timer circuit performs the counting operation. Since the output of the inverter circuit 43 is set to TICK.adj[1:0] when TICK.sync-in becomes "1" under this condition, the TICK.adj[1:0] becomes 10 . At this point, since the signal stop becomes "1"and the signal count becomes "0", the timer circuit stops counting.

TICK.adj[1:0]=10 corresponds to a stop condition, where the timer circuit stops counting as mentioned above, and holds the present TICK value. Even if TICK.sync-in becomes "1" under this condition, the value of TICK.adj [1:0] does not change. So, the operation is not affected.

TICK.adj[1:0]=11 corresponds to the synchronization condition where a TICK synchronization process is carried out, and the timer circuit stops counting. When TICK.sync-in becomes "1" under this condition, the output of the inverter circuit 43 is set to TICK.adj[1:0]. Therefore, TICK.adj[1:0] becomes 00. In this way, the timer circuit turns into the stable condition and resumes counting.

The corresponding relationship between the value of TICK.adj[1:0] and the condition of the timer circuit is summarized as follows:

"00": a stable condition (counting).
There is no change even when TICK.sync-in is received.
"01": a measurement condition (counting).
The counting operation is stopped when TICK.sync-in is received.
"01" is modified to "10".
"10": a stop condition (halt).
There is no change when TICK sync-in is received.
"11": a synchronization condition (halt).
The counting operation is resumed when TICK.sync-in is received.
"11" is modified" to "00".

Figure 4:
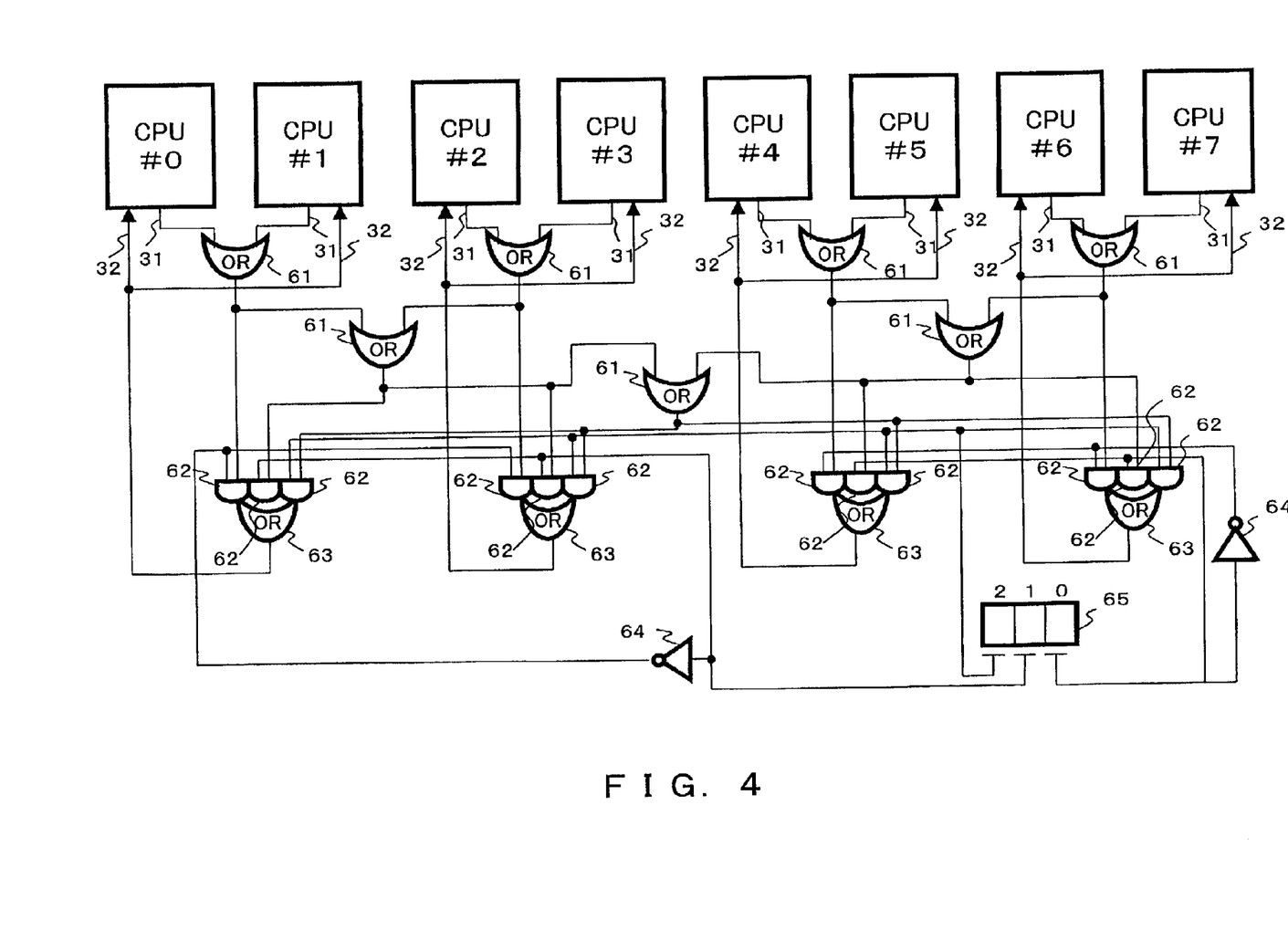
FIG. 4 is the configuration diagram of a partition control circuit and a TICK adjusting tree.

Next, Examples of the partition control circuit 25, the TICK adjusting trees 26 and 27 shown in FIG. 2 are further described with FIG. 4. In FIG. 4, the system configured by eight CPUs (CPUs #0 to #7) is shown to make the explanation simple, and a system bus, a switch circuit, and a main storage are omitted.

The circuit corresponding to the partition control circuit 25, and the TICK adjusting trees 26 and 27 includes seven OR circuits 61, twelve AND circuits 62, four OR circuits 63, two inverter circuits 64, and a partition control register 65.

The OR circuit 61 obtains a logical OR of TICK.sync-out's from two signal lines 31 or another logical OR of the outputs of two OR circuits 61 of the upstream stage, and outputs the logical OR to the OR circuit 61 or AND circuit 62 of the downstream stage. The AND circuit 62 generates the logical OR of the output of the OR circuit 61 and the output of the partition control register 65 or the inverter circuit 64, and outputs the logical OR to the OR circuit 63. The OR circuit 63 generates the logical OR of the three AND circuits 62, and outputs the logical OR to the signal line 32 as TICK.sync-in.

The inverter circuit 64 inverts the value of bit 0 or bit 1 of the partition control register 65, and outputs the inverted value to the AND circuit 62. The partition control register 65 has three control bits, and defines the logical dividing method of eight CPUs. The correspondence between the value of these control bits and the partition configuration are as follows: please note that the CPUs in each bracket configure single partition, and "x "may be either "0" or "1".

"000": (CPU#0, CPU#1), (CPU#2, CPU#3), (CPU#4, CPU#5), (CPU#6, CPU#7)
"001": (CPU#0, CPU#1), (CPU#2, CPU#3), (CPU#4, CPU#5, CPU#6, CPU#7)
"010": (CPU#0, CPU#1, CPU#2, CPU#3), (CPU#4, CPU#5), (CPU#6, CPU#7)
"011": (CPU#0, CPU#1, CPU#2, CPU#3), (CPU#4, CPU#5, CPU#6, CPU#7)
"1xx": (CPU#0, CPU#1, CPU#2, CPU#3 CPU#4, CPU#5, CPU#6, CPU#7)

According to the circuit configuration shown in FIG. 4, even if any value is set to the partition control register 65, the OR circuit 63 outputs the logical OR of TICK.sync-out's that are output from all the CPUs in the same partition. Then, the output of the OR circuit 63 is distributed to all the CPUs in the same partition as TICK.sync-in. Therefore, TICK.sync-in of all the CPUs are asserted in the partition, if any CPU in the same partition asserts TICK.sync-out.

The time adjustment program measures the time equivalent to the difference between the time when the CPU asserts TICK.sync-out and the time when the signal returns as TICK.sync-in through the TICK adjusting tree. Then, the measured time is notified to the time adjusting programs of all the CPUs in the same partition as the propagation delay time of a system time synchronous signal. The time adjusting program that is notified the propagation delay time corrects the TICK value of a timer circuit using the time. In this way, the timer circuits of all the CPUs in the same partition synchronize with each other.

In the TICK adjusting circuit shown in FIG. 3, a propagation delay time is measured with the timer circuit. Further, the counting operation of the timer circuit can be stopped in order to synchronize the timer circuit with another timer circuit which has been already adjusted. The time adjusting program writes the corrected TICK value in the register 53 as TICK-wr[n:0] after bringing the timer circuit to a stop condition.

In order for a timer circuit to resume counting, an already-adjusted timer circuit is used as the generating circuit of an updating start signal, and TICK.sync-out of the CPU including the adjusted timer circuit is used as an updating start signal output. Further, TICK.sync-in of the CPU including the timer circuit to be adjusted is used as an updating start signal input. The timer circuit to be adjusted resumes the counting operation based on the updating start signal input.

The TICK value shall not be modified during the system operation. Therefore, the propagation delay time of a system time synchronous signal is measured at the time of the initialization of a system or the dynamic reconfiguration of a system.

At the time of the initialization of a system, the time adjusting program on one of the CPUs in a partition measures the propagation delay time of a system time synchronous signal of the partition. Each CPU performs a time adjustment operation using the measured time.

For example, the area for storing a parameter that is common to the system is provided in the main storage, and the propagation delay time that is measured at the initialization is stored as one of the common parameters. In this way, a CPU can acquire the propagation delay time from the main storage when the adjustment of the timer circuit is required.

At the time of the dynamic reconfiguration of a system for addition or replacement of CPUs, the time adjusting program of the added CPU receives the TICK value that is adjusted using the propagation delay time from a CPU in the same partition. Next, the program stops the timer circuit, sets the received TICK value to the timer circuit, and waits for the receiving of TICK.sync-in. The program resumes the counting operation when TICK.sync-in is asserted, thereby adjusting time.

Further, the time adjusting program of the added CPU can also measure the propagation delay time alone. In this case, the added CPU receives a reference TICK value from the other CPU, corrects the TICK value using the propagation delay time, and sets the adjusted TICK value to the timer circuit. Then, the timer resumes counting when TICK.sync-in is asserted, thereby adjusting time.

Figure 5:
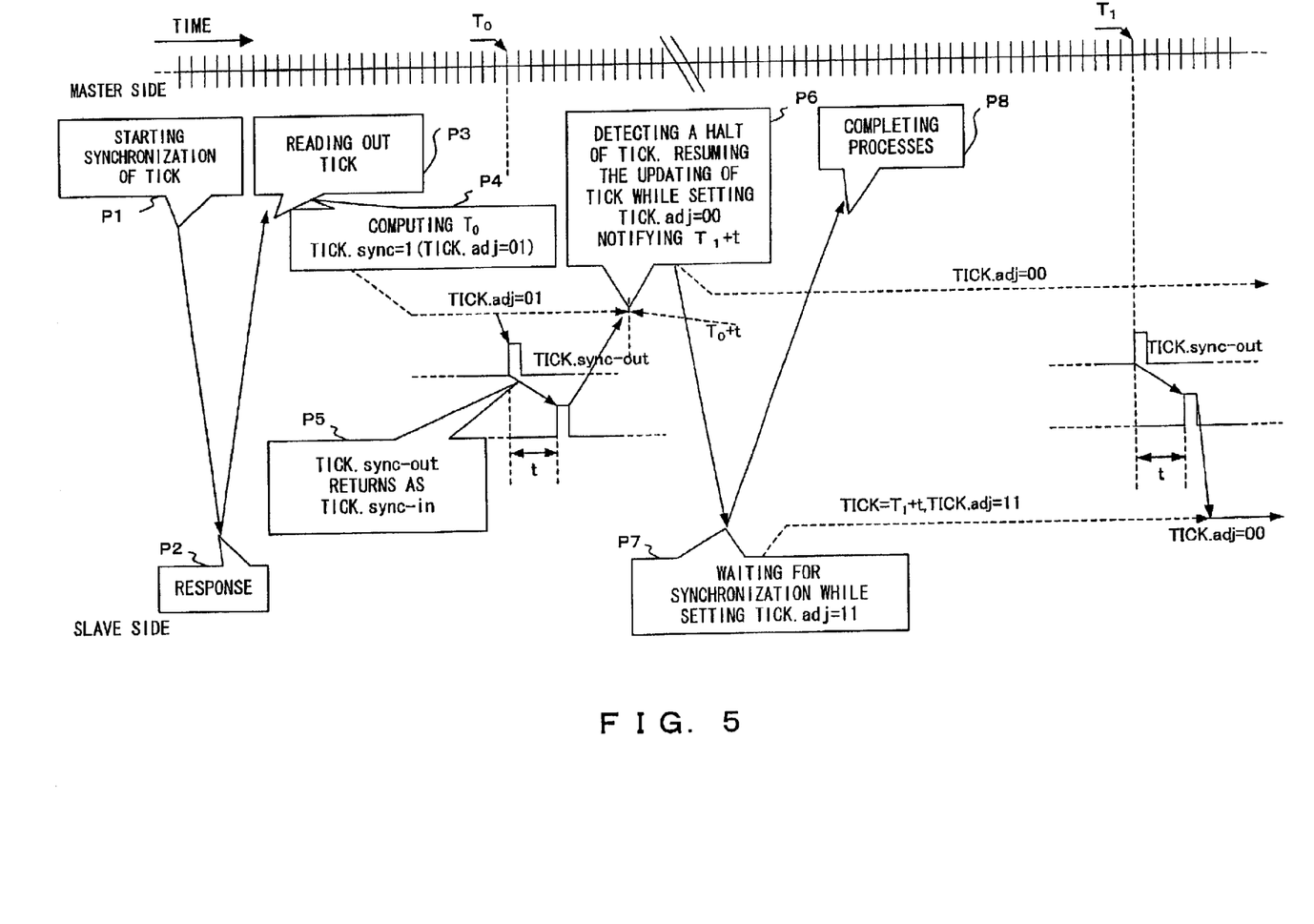
FIG. 5 is a diagram showing the first TICK adjustment.
Figure 6:
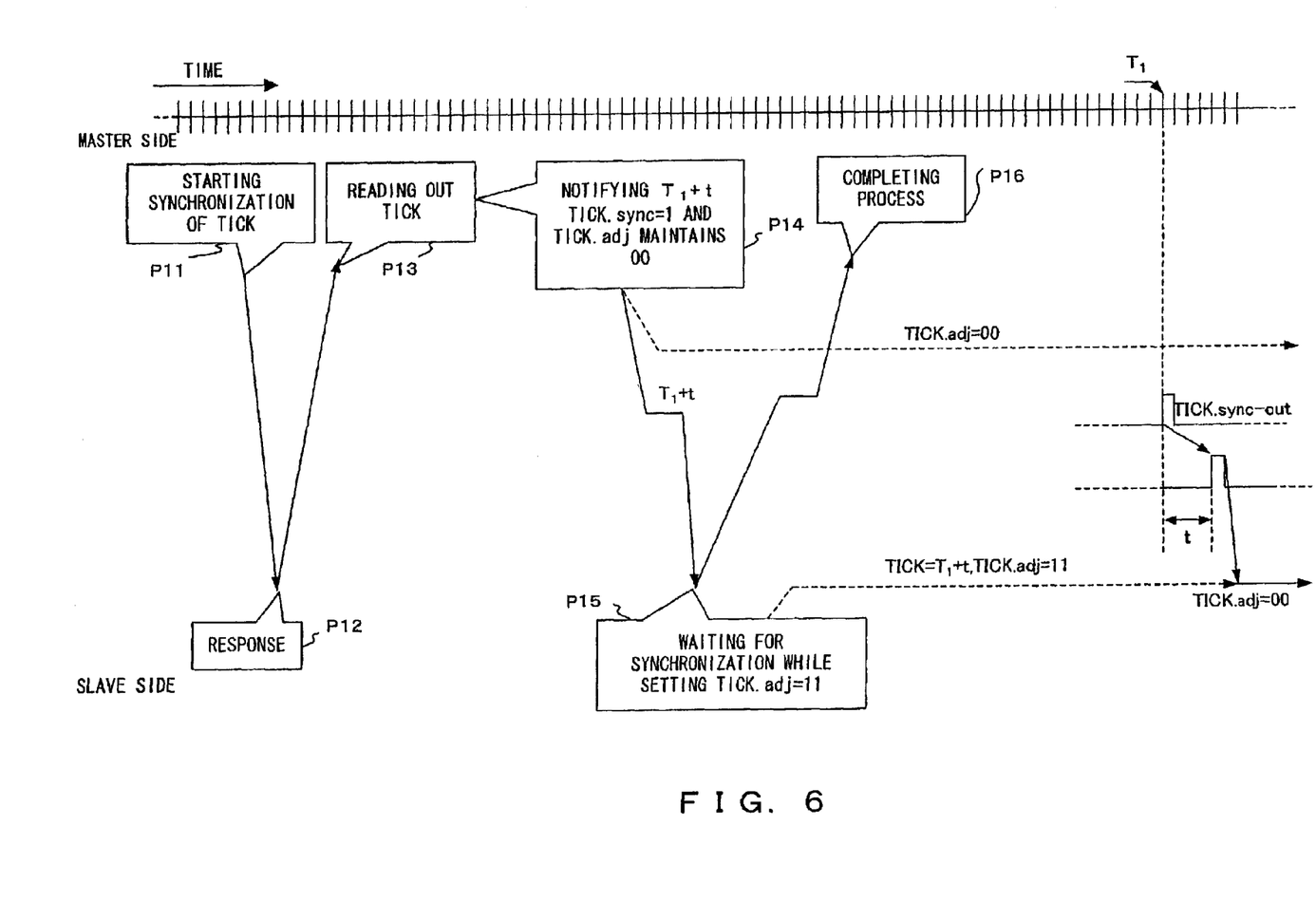
FIG. 6 is a diagram showing the second TICK adjustment.

An example of TICK synchronization process is described in reference to FIGS. 5 and 6.

FIG. 5 shows an example of the TICK synchronization process at the time of initialization of a system. In this case, one of the CPUs provided in the same partition becomes a master CPU while the other CPUs become slave CPUs. First of all, a system initialization is performed on the master CPU. When the initialization process completes, the system initialization program transfers the control to the time adjusting program that is actuated on the master CPU. The procedures for the timer adjustment of the master CPU and the slave CPUs are as follows:

P1: The time adjusting program of the master CPU notifies the start of a synchronization process of the TICK value (time) to all the slave CPUs, and waits for the responses from the slave CPUs.

P2: The time adjusting program of each slave CPU is notified the start of a synchronization process, and responds to the master CPU.

P3: When the time adjusting program of the master CPU receives the responses from all the slave CPUs, the program reads out the TICK value from the timer circuit, and starts to measure the propagation delay time.

P4: The time adjusting program of the master CPU computes the TICK value at the time when TICK.sync-out is asserted from the read-out TICK value, and recognizes computed value $T_0$ as the time for TICK.sync-out generation. Then, the program sets logic "1" to TICK.sync by setting *TS0-wr=0 and TS0-wr[0]=1, and sets "01" to TICK.adj by setting *TS1-wr=0 and TS1-wr[1:0]=01. In this way, the timer circuit of the master CPU is set in a measuring condition.

P5: When the TICK value becomes $T_0$, the master CPU asserts TICK.sync-out. The asserted TICK.sync-out is propagated through the TICK adjusting tree, and then returns to the master CPU as TICK.sync-in after a time t.

P6: At this time, TICK.adj=01. Therefore, when TICK.sync-in is received, the timer circuit of the master CPU stops updating, and TICK.adj becomes 10. The time adjusting program of the master CPU detects the halt of the timer circuit from the change of the value of TICK.adj, and terminates the measuring process.

The time adjusting program obtains the propagation delay time t by reading out the TICK value of the master CPU after the termination of the measuring process, and by subtracting $T_0$ from the TICK value. The program temporarily stores the propagation delay time t in a storage area which is common to the system, in preparation for the increase of CPUs during system operation. Then, the program sets "00" to TICK.adj, and resumes TICK update. The program then computes the TICK value $T_1$ as the reference time of synchronization from the read-out TICK value, and adds t to $T_1$, thereby correcting the value. Finally, the program sets the corrected TICK value $T_1$+t as TICK value used for synchronization, and notifies it to all the slave CPUs.

P7: The time adjusting program of each slave CPU that receives the TICK value for synchronization, sets $T_1$+t to the timer by setting *TICK-wr=0 and TICK-wr[n:0]=(binary code of $T_1$+t). Further, the program sets "11" to TICK.adj, sets the timer circuit in a synchronization condition, and responds with a ready notice for synchronization to the master CPU.

P8: The time adjusting program of the master CPU completes the process when it receives the responses from all the slave CPUs.

After that, the master CPU continues updating the TICK, and asserts TICK.sync-out when the TICK value reaches $T_1$. The TICK.sync-out is propagated through the TICK adjusting tree, and reaches all the slave CPUs at the time $T_1$+t after the time t, as TICK.sync-in.

The timer circuit of each slave CPU that receives TICK.sync-in resumes updating at the TICK value $T_1$+t set in advance. By switching over to the condition of TICK.adj= 00 (stable condition), the timer circuit terminates the TICK synchronization process. In this way, when the timer circuit of the master CPU counts $T_1$+t, the timer circuits of all the slave CPUs start to count the value at the same TICK value.

FIG. 6 shows an example of a TICK synchronization process when the number of processors is increased. In this case, one of the existing processors becomes a master CPU, and the CPUs to be added becomes slave CPUs. The operating system transfers the control to the time adjusting program that is operating on the master CPU after terminating all the processes of the system, and notifies the information of the slave CPU (CPU number, etc.) to the time adjusting program.

The procedures P11 to P13 shown in FIG. 6 are the same as P1 to P3 in FIG. 5. The consecutive procedures of the master processor and slave processors are as follows:

P14: The time adjusting program of the master CPU computes the reference time $T_1$ for synchronization from the TICK value that is read out at P13. The program obtains the propagation delay time t that is stored at the time of the system initialization from the storage area that is common to the system, and corrects $T_1$ by adding t to $T_1$. Then, the program notifies the corrected TICK value $T_1$+t to the slave CPUs as the TICK value for synchronization.

Then, the program prepares for the assertion of TICK.sync-out by setting "1" to TICK.sync. At this time, TICK.adj remains "00" and is not changed. Therefore, the timer circuit of the master CPU continues updating without being stopped.

P15: The time adjusting program of the slave CPU that is notified the Tick value for synchronization sets $T_1+t$ to the timer as the resumption time for update. Further, the program sets the timer circuit to the synchronization condition by setting "11" to TICK.adj, and responds to the master CPU with a ready notice for synchronization.

P16: The time adjusting program of the master CPU completes the process when it receives the responses from the slave CPUs, and returns the control to the operating system.

The operations in P14 through P16 of the master CPU and slave CPUs are the same as those shown in FIG. 5. In this way, when the timer circuit of the master CPU counts $T_1+t$, the timer circuits of the slave CPUs start to count at the same TICK value.

In the above-described embodiment, through the time adjustment process of the symmetric multi-processor system is explained, the present invention can be applied to an arbitrary multi-processor systems.

In the above-mentioned embodiment, the carry output of the timer circuit is used as a timing signal for generating TICK.sync-out. However, the carry output may be replaced with another timing signal. Further, TICK.sync-in is used as a signal for the resumption of the counting operation by the timer circuit, but this may be replaced with another timing signal.

In the above-mentioned embodiment, furthermore, the propagation delay time of the system time synchronous signal is measured using a timer circuit, but the time may be measured by the other methods such as software, etc.

According to the present invention, the time adjustment performed using software can be supported by only adding a small amount of simple and economical hardware in a multi-processor system, and the time adjustment can be achieved with very high accuracy.

What is claimed is:

1. A timer adjusting system for adjusting timers of a plurality of processors in a multi-processor system, each processor including a generating circuit generating a time synchronous signal for the multi-processor system, an output circuit outputting the time synchronous signal, and an input circuit inputting the time synchronous signal, said time adjusting system comprising:

a distributing circuit propagating the time synchronous signal output from the output circuit of one of the processors to all of the processors in the multi-processor system and returning the time synchronous signal to the input circuit of the one of the processors after being propagated in the multi-processor system;

a measuring circuit measuring a time from when the output circuit of the one of the processors outputs the time synchronous signal to when the input circuit of the one of the processors inputs the time synchronous signal; and a synchronization circuit correcting time information of one or more timers of the plurality of processors using the measured time as a time for distributing the time synchronous signal to the plurality of processors in the multi-processor system, and synchronizing the timers of the plurality of processors.

2. The timer adjusting system according to claim 1, wherein the generating circuit generates the time synchronous signal using a signal that is generated by one of the timers of the plurality of processors.

3. The timer adjusting system according to claim 1, wherein the measuring circuit measures the time for distributing the time synchronous signal, using one of the timers of the plurality of processors.

4. The timer adjusting system according to claim 1, wherein the synchronization circuit comprises:

a first software unit executing a software command for controlling a reference timer among the timers of the plurality of processors; and a second software unit executing a software command for controlling a timer to be corrected, and the synchronization circuit corrects time information of the timer to be corrected using time information of the reference timer and the measured time.

5. The timer adjusting system according to claim 4, further comprising a generating circuit generating a start signal that starts a counting operation of the timer to be corrected when the input circuit inputs the time synchronous signal, wherein the second software unit stops the timer to be corrected, stores the corrected time information in the timer to be corrected, and sets the timer to be corrected in a condition where a counting operation starts based on the start signal.

6. The timer adjusting system according to claim 5, wherein the measuring circuit measures the time for distributing the time synchronous signal at a time of reconfiguration of the multi-processor system with addition of a processor, and the second software unit controls the timer of the processor to be added as the timer to be corrected.

7. The timer adjusting system according to claim 1 further comprising a storing circuit storing the measured time, wherein the measuring circuit measures the time for distributing the time synchronous signal at the time of initialization of the multi-processor system, and stores the measured time in the storing circuit, and wherein the synchronization circuit obtains the stored time at the time of correction for a value in the timer to be corrected.

8. A timer adjusting system adjusting timers of a plurality of processors in a multi-processor system, each of the plurality of processors comprising:

a generating circuit generating a time synchronous signal for the multi-processor system;

an output circuit outputting the time synchronous signal as a synchronous output; and an input circuit inputting a synchronous input, and the timer adjusting system comprising:

a distributing circuit generating a logical OR signal of a plurality of synchronous output output by the plurality of processors, and distributing the logical OR signal to the plurality of processors as the synchronous input;

a measuring circuit measuring a time while one of the plurality of processors outputs the synchronous output and receives the synchronous input; and a synchronization circuit correcting time information of one or more timers of the plurality of processors using the measured time as a time for propagating the logical OR signal, and synchronizing the timers of the plurality of processors.

9. The timer adjusting system according to claim 8, further comprising a control circuit dividing the multi-processor system into a plurality of partitions, and activating each partition as a symmetric multi-processor system, wherein the distributing circuit generates a logical OR signal of synchronous outputs that are output from processors belonging to each partition, and distributes the logical OR signal to the processors belonging to each partition as a synchronous input, and the synchronization circuit synchronizes timers of the processors belonging to each partition.

10. A timer adjusting system for adjusting timers of a plurality of processors in a multi-processor system, each processor generating a time synchronous signal for the multi-processor systems, outputting the time synchronous signal, and inputting the time synchronous signal, said timer adjusting system comprising:

distributing means for propagating the time synchronous signal output from the output circuit of one of the processors to all of the processors in the multi-processor system and for returning the time synchronous signal to the input circuit of the one of the processors after being propagated in the multi-processor system;

measuring means for measuring a time during which the one of the processors outputs the time synchronous signal and inputs the time synchronous signal; and synchronizing means for correcting time information of one or more timers of the plurality of processors using the measured time as a time for distributing the time synchronous signal to the plurality of processors in the multi-processor system, and synchronizing the timers of the plurality of processors.

11. A timer adjusting system adjusting timers of a plurality of processors in a multi-processor system, each of the plurality of processors comprising:

generating means for generating a time synchronous signal for the multi-processor system;

output means for outputting the time synchronous signal as a synchronous output; and input means for inputting a synchronous input, and the timer adjusting system comprising:

distributing means for generating a logical OR signal of a plurality of synchronous outputs output by the plurality of processors, and distributing the logical OR signal to the plurality of processors as the synchronous input;

measuring means for measuring a time while one of the plurality of processors outputs the synchronous output and receives the synchronous input; and synchronizing means for correcting time information of one or more timers of the plurality of processors using the measured time as a time for propagating the logical OR signal, and synchronizing the timers of the plurality of processors.

* * * * *